UNITED STATES PATENT OFFICE.

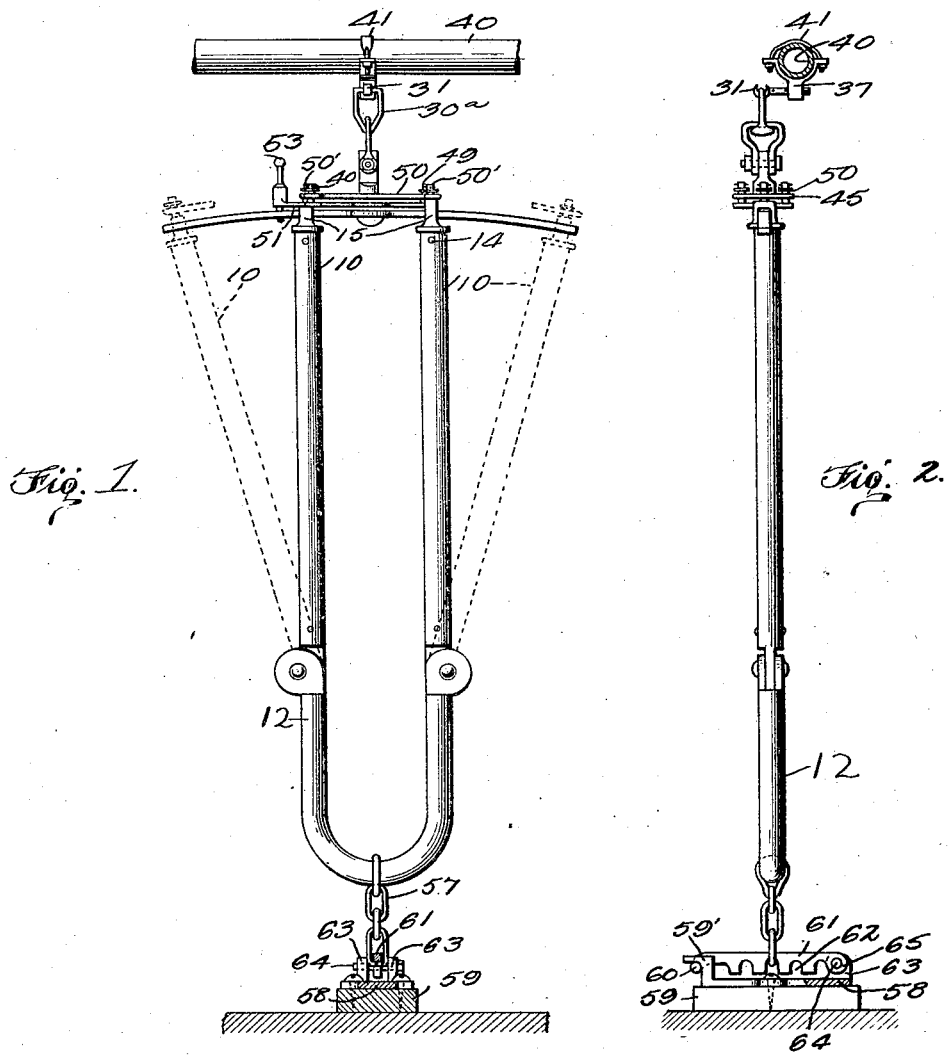

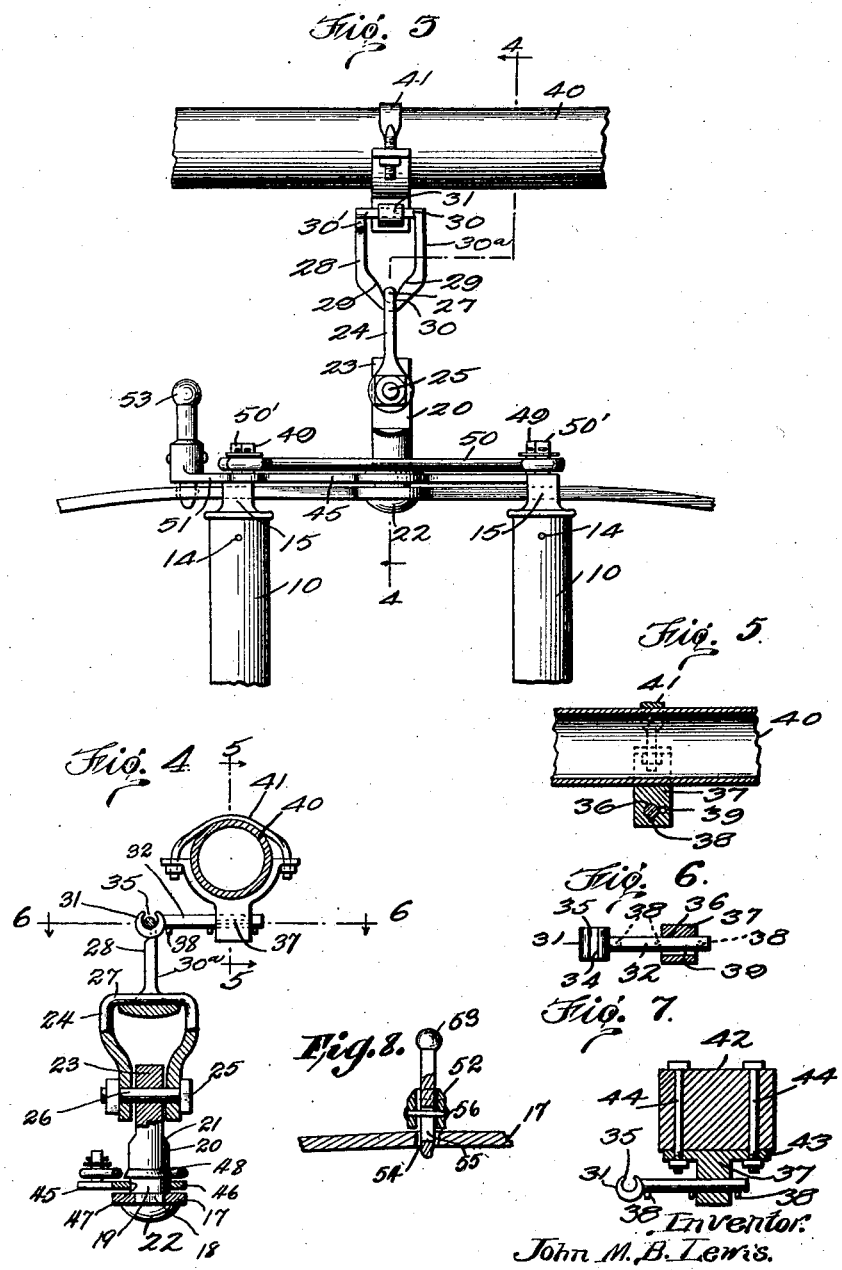

JOHN MINOR BOTTS LEWIS, OF LYNCHBURG, VIRGINIA, ASSIGNOR TO COWMATIC CORPORATION, OF LYNCHBURG, VIRGINIA, A CORPORATION OF VIRGINIA.

STANCHION-SUPPORT.

1,341,989.      Specification of Letters Patent.      Patented June 1, 1920.

Original application filed February 18, 1919, Serial No. 277,778. Divided and this application filed July 16, 1919. Serial No. 311,289.

*To all whom it may concern:*

Be it known that I, JOHN M. B. LEWIS, a citizen of the United States, residing at Lynchburg, in the county of Campbell and State of Virginia, have invented certain new and useful Improvements in Stanchion-Supports, of which the following is a specification.

This invention relates to supports for animal stanchions and has for its object the provision of such a support which allows a limited amount of freedom to the animal.

A further object is the provision of such a support which will maintain the alinement of the stanchion with the stall.

A still further object is the provision of a support which may be readily disengaged by the attendant but impossible of release by the animal.

These and other objects I attain by the combination and construction shown in the accompanying drawings, which will be considered in an illustrative and not a limiting sense, and in which:

Figure 1 is a front elevation of a stanchion embodying my device;

Fig. 2 is a side elevation thereof;

Fig. 3 is an enlarged front elevation of the upper end of the stanchion, parts being broken away;

Fig. 4 is a section on the line 4—4 of Fig. 3;

Fig. 5 is a section on the line 5—5 of Fig. 4;

Fig. 6 is a detail section, taken on line 6—6 of Fig. 4;

Fig. 7 is a detail section, showing a slightly different form of attaching member; and Fig. 8 is a detail section.

In the drawings, wherein for the purpose of illustration is shown a preferred embodiment of my invention combined with the stanchion forming the subject-matter of my copending application No. 277,778, filed February 18, 1919, which has since become Patent No. 1,329,417 dated February 3, 1920, of which this application is a division, the numeral 10 designates the oppositely arranged arms or sides of the stanchion. These arms are preferably pivoted, at their lower ends, as shown at 11, to a U-shaped impeding element 12.

The arms 10 are preferably tubular and at their upper ends, receive coupling-plugs 13. These coupling-plugs are provided with heads 15, having transverse openings 16, receiving a preferably longitudinally curved transverse support-bar 17. The outer portions of this support-bar are curved in arcs of circles which are concentric with the pivots 11, as shown.

The support-bar 17 is provided at a point preferably equi-distantly spaced from the ends thereof with an opening 18, which is preferably formed square in cross section for receiving a square portion 19 of a suspension element 20. Above the support-bar 17, this suspension element has a shoulder 21, and below it a head 22 is formed by flattening or hammering the end of the portion 19. The suspension element 20 is provided at its upper end with a flat portion 23, adapted for insertion within a lower inverted approximately U-shaped link 24, and apertured for pivotally receiving a bolt 25, passing through apertures 26 in the lower link 24. This lower link has an upper transverse portion 27, extending within and transversely of an upper link 28, having inclined or cam faces 29, and a groove 30, receiving the transverse portion 27, as shown. It is thus seen that should the stanchion be turned upon its longitudinal axis the support-bar will turn the supporting element 20, whereby the link 24 will cause its transverse portion 27 to ride upon the cam faces 29. As soon as the stanchion is released, these cam faces will automatically return it to the proper transverse position.

The upper link 28 is provided with a transverse member 30$^a$ and an opening or notch 30', near and beneath the transverse member 30$^a$. The transverse member 30$^a$ is adapted for insertion within a head 31, of an upper supporting member, carried by a shank 32. The head 31 has a cylindrical opening 33, having a contracted upper opening 34. When the upper link 28 is inverted, so that the opening or notch 30' will receive the jaw 35, the transverse portion 30$^a$ may be inserted within the opening 34, subsequently of which the link 28 is swung downwardly. It is thus seen that it will be impossible for the link 28 to be separated from the head 31 until it is again inverted, but this link is free to partake of restricted swinging movements, longitudinally of the stall.

The shank 32 is adapted to be adjustably mounted within an opening 36, formed in a support block 37. The shank 32 also carries spaced pins 38, for insertion within a groove 39, which is horizontally arranged. The shank 32 may be inserted within the opening 36 when the pins 38 are positioned to enter the groove 39, and the shank 32 is then turned so that these pins assume a vertical position, thereby positively preventing longitudinal displacement of the shank. The shank however is free to partake of slight turning movement. The support block 37 is secured to a pipe rail 40 by a U-shaped member 41, as shown. When the rail 40 is not used, a beam 42 may be substituted therefor, (see Fig. 7) and the support block 39 will then be equipped with a flat base 43 apertured for receiving bolts 44, as shown.

Means are provided to shift the arms 10 to the opened and closed positions, comprising a lever 45, provided at a point equidistantly spaced from the ends thereof with a cylindrical opening 46, pivotally receiving a cylindrical portion 47 of the supporting element 20, there being a flange or shoulder 48 above the same. The opposite ends of this lever 45 are apertured for receiving pivot elements 49 having pivotal connection with links 50; the opposite ends of which are pivoted to studs 50', rigidly secured to the heads 15. At one end of the lever 45, there is an extension 51, preferably formed integral therewith, and this extension is equipped with a tubular head 52. This tubular head slidably receives a vertically movable bolt 53, adapted to enter a vertical opening 54 in the transverse support-bar 17. The bolt 53 has a longitudinal slot 55, receiving a transverse pin 56, which prevents its displacement.

At its lower end, the impeding element 12 has suitable connection with a chain or flexible anchor element 57 which is adjustably connected with an anchor device to be now described. This anchor device extends longitudinally of the stall and embodies a base plate 58, which is bolted or otherwise rigidly secured to the ledge 59 of the floor of the stall. This base plate is provided at one end with L-shaped members or knuckles 59', adapted to receive therebeneath a transverse head 60, formed upon an upper bar 61. This upper bar has a series of openings or notches 62, spaced longitudinally of the same, for receiving the lowermost link of the chain. At its opposite end the base plate 58 is provided with a pair of spaced apertured knuckles 63 receiving a bolt 64, passing through a knuckle on the bar 61. It is thus seen that the upper and lower connections for the stanchion may be adjusted longitudinally of the stall.

Having thus described my invention, I claim:

1. An animal stanchion of the character described, comprising a pair of spaced arms, flexible supporting means for the arms arranged near the upper ends thereof and including a link having a transverse member and a notch arranged near the transverse member, and a head provided near its top with a contracted opening, for coaction with said notch when the link is moved to the inverted position so that the transverse member of the link may be inserted within the head and readily removed therefrom.

2. In an animal stanchion, flexible supporting means comprising a lower link having a transverse member, an upper link provided with inclined sides to contact with the transverse member and having a transverse member and a notch formed through one side thereof near its transverse member, and a head having a bore for the reception of the transverse member of the second named link and an opening in its top for coaction with the notch of the second named link.

3. In an animal stanchion of the character described, a pair of spaced pivoted arms, heads carried by said arms, said heads being provided with openings, a supporting rod passing through said openings, and flexible supporting means secured to said supporting rod, said means comprising a link having a transverse member and a notch arranged near the transverse member, and a head arranged near its top and provided with a contracted opening for co-action with said notch when the link is moved to an inverted position to permit insertion of the transverse member of the link within the head.

In testimony whereof I affix my signature in presence of two witnesses.

JOHN MINOR BOTTS LEWIS.

Witnesses:
J. D. PLEASANTS,
J. W. ARTHUR.